C. E. LANGMAID.

Sewing-Machine.

No. 132,968.                  Patented Nov. 12, 1872.

WITNESSES
Frank G. Parker
John J. Haley

INVENTOR.
Charles E. Langmaid
pr William Edson atty

UNITED STATES PATENT OFFICE.

CHARLES E. LANGMAID, OF STONEHAM, MASSACHUSETTS, ASSIGNOR OF ONE-HALF HIS RIGHT TO GEORGE A. LANGMAID, OF SAME PLACE.

IMPROVEMENT IN SEWING-MACHINES.

Specification forming part of Letters Patent No. 132,968, dated November 12, 1872.

*To all whom it may concern:*

Be it known that I, CHARLES E. LANGMAID, of Stoneham, in the county of Middlesex and State of Massachusetts, have invented certain new and useful Improvements in Sewing-Machines, of which the following is a specification:

The Nature of the Invention.

The nature of my invention consists in combining with the head-block through which the needle-bar works a mechanism by which the said head-block and needle-bar are made to move backward and forward by an intermittent motion, thus causing the machine to sew a sinuous line of stitches, the line admitting of a great variety of styles—that is, it may form a zigzag, a serpentine, or Greek line, as may be desired.

General Description.

Figure 1:
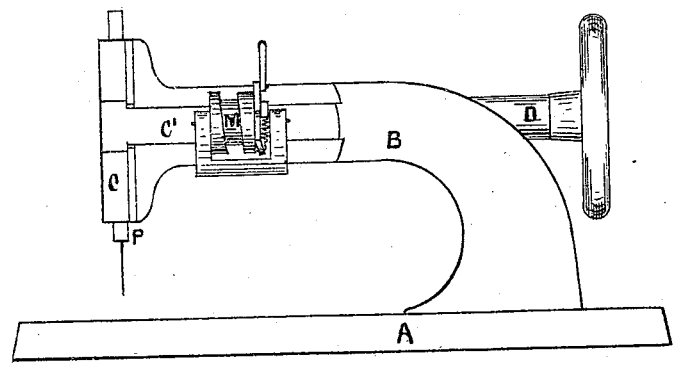
Figure 1 is an elevation, showing my invention.
Figure 2:
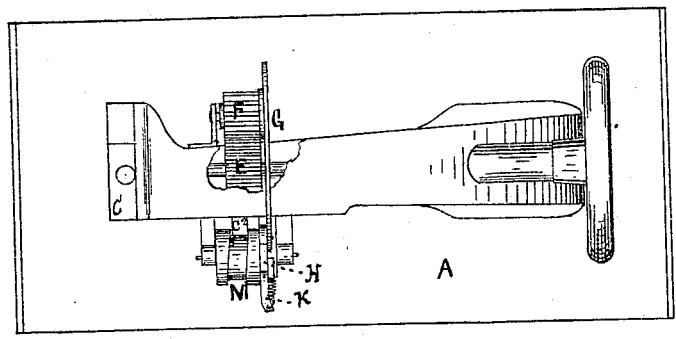
Fig. 2 is a plan of the same.
Figure 3:
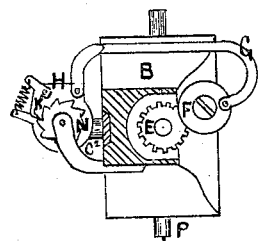
Fig. 3 is a cross-section, showing details.

Let A represent the table or plate of the machine, and B the arm in which the needle-driving shaft D is hung. P is the needle-bar, and may be driven in any of the approved methods. The head-block C, through which the needle-bar P works, is made movable, and is provided with a shank, $C^1$, which, sliding in a groove in the arm B, admits of the motion of the head-block, and yet holds it securely from any lateral motion. $C^2$, Figs. 2 and 3, is a start fixed in the shank $C^1$, and the head-block C, together with the needle-bar, will move back and forth, thus causing the machine to stitch a sinuous line. The cam is actuated by the link G, which works the plate H and pawl K. The link G is attached to a crank-pin in the wheel F, the wheel F being driven by the wheel E on the shaft D.

From the above it will be seen that the motion imparted to the head-block, giving a lateral motion to the needle, and thus causing it to stitch in a sinuous line, is governed entirely by the cam M, and that by giving peculiar forms to the cam-groove a great variety of styles of stitches may be made.

I do not claim, broadly, the employment of a movable head-block; but

I claim as my invention—

The combination of the wheels E F, link G, plate H, pawl K, ratchet-wheel N, cam M, with the movable head-block C having the shank $C^1$, and start $C^2$, as described.

CHARLES E. LANGMAID.

Witnesses:
WILLIAM EDSON,
FRANK G. PARKER.